(12) United States Patent
Shimoni et al.

(10) Patent No.: US 9,158,913 B2
(45) Date of Patent: Oct. 13, 2015

(54) MANAGING VIRTUAL MACHINES USING OWNER DIGITAL SIGNATURES

(75) Inventors: Shalom Shimoni, Lezion (IL); Nir Barak, Yosef (IL); Amir Jerbi, Givatayim (IL); Yaron Holland, Hod Hasharon (IL)

(73) Assignee: CA, Inc., New York, NY (US)

( * ) Notice: Subject to any disclaimer, the term of this patent is extended or adjusted under 35 U.S.C. 154(b) by 224 days.

(21) Appl. No.: 13/544,505

(22) Filed: Jul. 9, 2012

(65) Prior Publication Data

US 2014/0013325 A1    Jan. 9, 2014

(51) Int. Cl.
  *G06F 9/455* (2006.01)
  *G06F 21/52* (2013.01)
  *G06F 21/57* (2013.01)

(52) U.S. Cl.
  CPC ............ *G06F 21/52* (2013.01); *G06F 9/45558* (2013.01); *G06F 21/575* (2013.01); *G06F 2009/45587* (2013.01)

(58) Field of Classification Search
  USPC .......................................................... 718/1
  See application file for complete search history.

(56) References Cited

U.S. PATENT DOCUMENTS

| | | | | |
|---|---|---|---|---|
| 2005/0273388 | A1* | 12/2005 | Roetter | 705/14 |
| 2008/0047015 | A1* | 2/2008 | Cornwall et al. | 726/25 |
| 2009/0271428 | A1* | 10/2009 | Adelman et al. | 707/101 |
| 2013/0185812 | A1* | 7/2013 | Lie et al. | 726/29 |

\* cited by examiner

*Primary Examiner* — Emerson Puente
*Assistant Examiner* — Steven Do
(74) *Attorney, Agent, or Firm* — Myers Bigel Sibley & Sajovec, P.A.

(57) ABSTRACT

A computer system is disclosed that includes a host operating system and a virtual hypervisor that operates under management of the host operating system to control operations of virtual machines operating under management of the virtual hypervisor. The virtual hypervisor provides an interface between the virtual machines and the host operating system. A signing component generates digital signatures which identify owners of the virtual machines and associates the digital signatures with the virtual machines. A signature validation component determines the owners of the virtual machines using the digital signatures and responsive to occurrence of defined events. Related methods and computer program products for operating computer systems are also disclosed.

15 Claims, 6 Drawing Sheets

Algorithmically combining information items characterizing the owner of a particular one of the virtual machines to generate the digital signature that is to be associated with the particular virtual machine — 400

MANAGING VIRTUAL MACHINES USING OWNER DIGITAL SIGNATURES

BACKGROUND

The present disclosure relates to computer systems, and in particular to managing access to resources of computer systems, such as in virtualized computer environments.

Virtualized computer environments, also referred to as cloud computer systems, are used to provide computer resources to end users. In a cloud computer environment, the physical hardware configuration is hidden from the end user. Cloud computer systems may include servers, network storage devices, routers, gateways, communication links, and other devices. However, because the physical hardware and software platforms on which cloud computer system is implemented are hidden within a "cloud," they can be managed, upgraded, replaced or otherwise changed by a system administrator without the customer being aware of or affected by the change.

In a typical cloud computer environment, applications may be executed on virtual machines, which are isolated guest operating systems installed within a host system. Virtual machines are typically implemented with software emulation, hardware virtualization, or both. A single hardware and/or software platform may host a number of virtual machines, each of which may have access to some portion of the platform's resources, such as program code processing resources, storage resources, display resources, communication interfaces, etc.

Because cloud computing treats computer resources as remote services that are accessed by customers, and because the actual physical resources that are used to implement a cloud computing environment may be accessed by many different customers, security is an important aspect of cloud computing.

BRIEF SUMMARY

Some embodiments disclosed herein are directed to a computer system that includes a host operating system and a virtual hypervisor that operates under management of the host operating system to control operations of virtual machines operating under management of the virtual hypervisor. The virtual hypervisor provides an interface between the virtual machines and the host operating system. A signing component generates digital signatures which identify owners of the virtual machines and associates the digital signatures with the virtual machines. A signature validation component determines the owners of the virtual machines using the digital signatures and responsive to occurrence of defined events.

Some other embodiments disclosed herein are directed to a method of operating a computer system that includes a plurality of virtual machines that are managed by a virtual hypervisor. Digital signatures are generated which identify owners of the virtual machines. The digital signatures are associated with the virtual machines. Owners of the virtual machines are determined using the associated digital signatures responsive to occurrence of defined events.

Some other embodiments disclosed herein are directed to a computer program product for operating a computer system that includes a plurality of virtual machines that are managed by a virtual hypervisor. The computer program product includes a computer readable storage medium having computer readable program code embodied in the medium. The computer readable program code comprises computer readable program code configured to generate digital signatures which identify owners of the virtual machines, computer readable program code configured to associate the digital signatures with the virtual machines, and computer readable program code configured to determine the owners of the virtual machines using the associated digital signatures and responsive to occurrence of defined events.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description and protected by the accompanying claims.

BRIEF DESCRIPTION OF THE DRAWINGS

The accompanying drawings illustrate various embodiments of the invention, and are incorporated herein and constitute a part of this application. In the drawings.

DETAILED DESCRIPTION

Embodiments of the present invention now will be described more fully hereinafter with reference to the accompanying drawings, in which embodiments of the invention are shown. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Some embodiments disclosed herein may arise from the present realization that known virtualized computing environments do not associate information with virtual machines that identifies the owners of virtual machines, and they furthermore do not manage individual ones of the virtual machines responsive to whether the virtual machine is associated with an owner and/or whether the owner has been validated.

Figure 1:
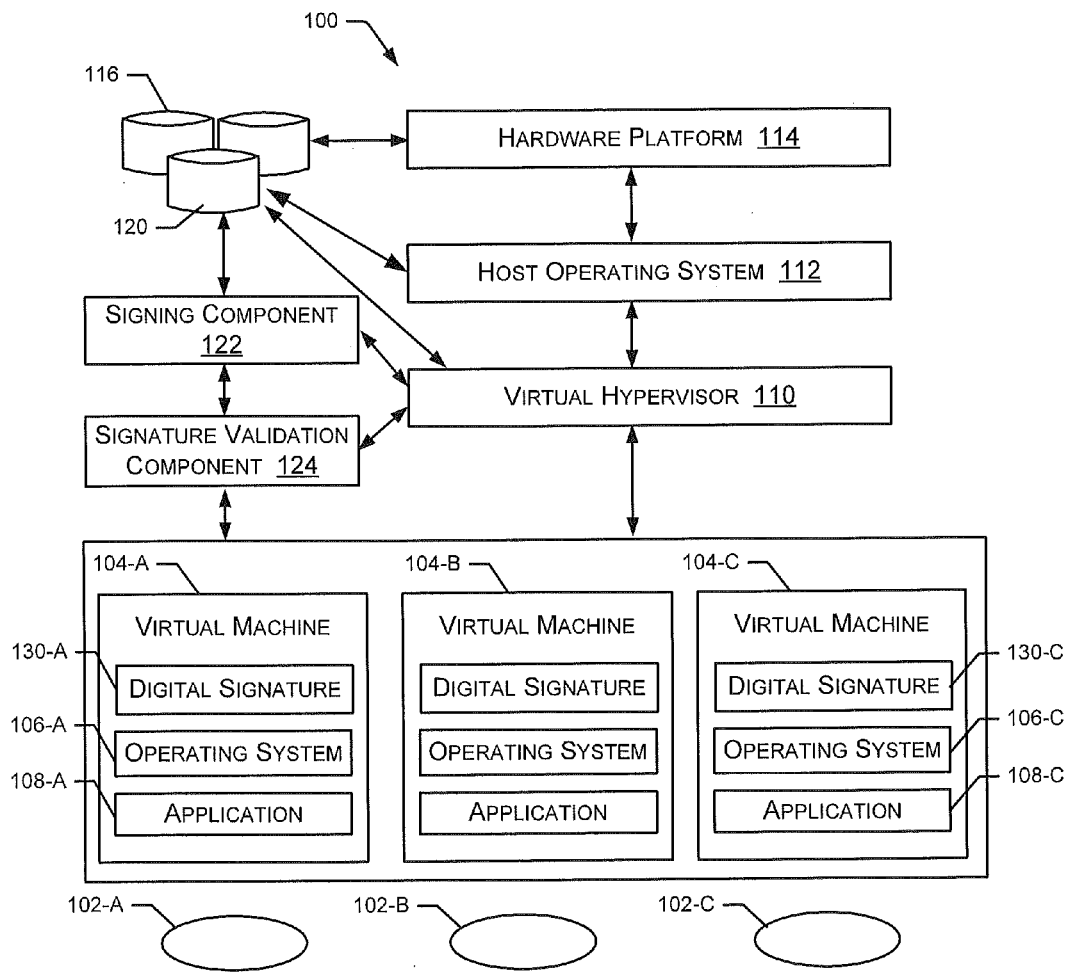
FIG. 1 is a block diagram of a virtualized computer environment that manages access by virtual machines to resources of a computer system using digital signatures.

Various embodiments disclosed herein are explained with regard to the example virtualized computer environment of FIG. 1 that manages access to resources of a computer system 100 by virtual machines 104 using digital signatures that identify owners of the virtual machines 104. Referring to FIG. 1, the computer system 100 generally hosts and manages one or more virtual machines 104, each of which runs a guest operating system 106 and an application 108. The computing needs of users 102 (e.g., humans and/or other virtual/non-virtual machines) drive the functionality of the virtual machines 104. A virtual hypervisor 110 can provide an interface between the virtual machines 104 and a host operating system 112 and allow multiple guest operating systems 106 and associated applications 108 to run concurrently. The host operating system 112 handles the operations of a hardware platform 114 capable of implementing the virtual machines 104. A data storage space 116 may be accessed by the host operating system 112 and is connected to the hardware platform 114.

The hardware platform 114 generally refers to any computer system capable of implementing virtual machines 104, which may include, without limitation, a mainframe computer platform, personal computer, mobile computer (e.g., tablet computer), server, wireless communication terminal (e.g., cellular data terminal), or any other appropriate program code processing hardware. The hardware platform 114 may include computer resources such as a processing circuit(s) (e.g., central processing unit, CPU); networking controllers; communication controllers; a display unit; a program and data storage device; memory controllers; input devices (such as a keyboard, a mouse, etc.) and output devices such as printers. The processing circuit(s) is configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The hardware platform 114 may be further connected to the data storage space 116 through serial or parallel connections. The data storage space 116 may be any suitable device capable of storing computer-readable data and program code, and it may include logic in the form of disk drives, random access memory (RAM), or read only memory (ROM), removable media, or any other suitable memory component. According to the illustrated embodiment, the host operating system 112 functionally interconnects the hardware platform 114 and the users 102 and is responsible for the management and coordination of activities and the sharing of the computer resources.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the system 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 can create an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) runs on the host operating system 112 and provides an interface between the virtual machine 104 and the hardware platform 114 through the host operating system 112. The virtual hypervisor 110 virtualizes the computer system resources and facilitates the operation of the virtual machines 104. The hypervisor 110 may provide the illusion of operating at the highest priority level to the guest operating system 106. However, the virtual hypervisor 110 can map the guest operating system's priority level to a priority level lower than the top most priority level. As a result, the virtual hypervisor 110 can intercept the guest operating system 106, and execute instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 can also be performed by the virtual hypervisor 110.

The virtual machines 104 present a virtualized environment to the guest operating systems 106, which in turn provide an operating environment for applications 108 and other software constructs.

In accordance with some embodiments, the system 100 associates information with the virtual machines 104 that identifies the owners of the virtual machines 104, and furthermore manages particular ones of the virtual machines 104 responsive to whether they are associated with an owner, responsive to whether the owners are properly validated, and/or responsive to communications that are performed with the owners identified for the virtual machines 104. The owners of the virtual machines 104 may, for example, correspond to the users 102 (e.g., humans and/or other virtual/non-virtual machines) of FIG. 1 who initiate, control, benefit, and/or are otherwise associated with the virtual machines 104.

The system 100 includes a signing component 122 and a signature validation component 124. Operations and methods that may be performed by the signing component 122 and the signature validation component 124 are explained below with reference to the flowcharts of FIGS. 3-10.

The signing component 122 is executed by the hardware platform 114, and generates (block 300 of FIG. 3) digital signatures which identify owners of the virtual machines 104 and associates (block 302 of FIG. 3) the digital signatures with the virtual machines 104. The signature validation component 124 is executed by the hardware platform 114, and determines (block 304 of FIG. 3) the owners of the virtual machines 104 using the digital signatures and responsive to occurrence of defined events.

The digital signatures may be stored in a signature repository 120, which may be located within the data storage space 116, the signing component 122, the signature validation component 124, and/or partially or wholly located elsewhere within the system 100. Although the signature repository 120, the signing component 122, and the signature validation component 124 have been illustrated in FIG. 1 as separate functional blocks, some or all of their functionality described herein may be incorporated within more components or other components of the system 100.

A digital signature can be generated by an algorithmic process that generates data which uniquely identifies an owner of a particular virtual machine 104, and that may further support a validation process to confirm the authenticity of the owner. A valid digital signature enables the signature validation component 124 to know who owns the associated virtual machine 104, and enables the signature validation component 124 to regulate the virtual hypervisor 110 to control access by the virtual machine 104 to resources of the system 100.

The signing component 122 may algorithmically combine (block 400 of FIG. 4) information items that characterize the owner of a particular one of the virtual machines to generate the digital signature that becomes associated with the particular virtual machine. The digital signature may be generated by hashing owner information, such as a user identifier, password, email address, telephone number, mailing address, other owner contact information, or other data that uniquely identifies the owner. The hash algorithm may include any cryptographic hash function, such as a Message Digest (MD) algorithm, a Secure Hash Algorithm (SHA), etc.

The signing component 122 may generate the digital signature as a public key certificate (also known as a digital certificate or identity certificate) that is associated with an owner identity (information such as the name of a person or an organization, an address, etc.). The certificate can be used to verify that a public key belongs to an owner.

The signing component 122 may store the digital signature as a data component 130 in the virtual machine 104. In one embodiment, the signing component 122 adds the digital signature as an agent component (e.g., 130-A) of a particular one of the virtual machines (e.g., 104-A). The signature validation component 124 can query the digital signature agent component 130-A of the particular virtual machine 104-A to obtain the digital signature, and determine the owner of the particular virtual machine 104-A responsive to the obtained digital signature.

The signing component 122 may also store the digital signature in the signature repository 120 for validation purposes. To validate a digital signature associated with a particular virtual machine 104-A, the signature validation component 124 may, for example, compare the digital signature 130-A associated with the particular virtual machine 104-A to the digital signature obtained from the signature repository 120, and determine that the digital signature 130-A is valid when the comparison identifies a match.

The signature validation component 124 may alternatively, or additionally, validate a digital signature associated with a particular virtual machine 104-A by using the digital signature to identify contact information for the associated owner, and contacting the owner to request credentials (e.g., user identifier, password, email address, telephone number, mailing address, other owner contact information, and/or other data that uniquely identifies the owner) that are validated by the signature validation component 124.

The signature validation component 124 can operate during startup of the virtual machines 104 to prevent execution of a virtual machine 104 that is missing a digital signature and/or which has a digital signature that fails validation. The signature validation component 124 may alternatively or additionally provide management oversight while virtual machines 104 are executing on the hardware platform 114 to prevent continued execution of a virtual machine 104 that is missing a digital signature and/or which has a digital signature that fails validation.

When the virtual machine 104 is missing a digital signature or has a digital signature that fails validation, the signature validation component 124 may trigger the signing component 122 to communicate with an owner to obtain credentials (e.g., user identifier, password, email address, telephone number, mailing address, other owner contact information, and/or other data that uniquely identifies the owner) that can be validated and used to generate a digital signature for association with that virtual machine 104. Alternatively, the signature validation component 124 may use owner contact information provided by a digital signature to contact the owner and conduct a validation process therewith, and then manage the associated virtual machine responsive to the outcome of the validation process.

In one embodiment, the signature validation component 124 determines (block 500 of FIG. 5) that the virtual hypervisor 110 is attempting to startup a particular one of the virtual machines 104-A that is not associated with one of the digital signatures. For example, the determination may be made responsive to a notification received from the virtual hypervisor 110. The signature validation component 124 and/or the signing component 122 initiates (block 502 of FIG. 5) an electronic communication to an owner of the particular virtual machine 104-A that requests the owner credentials. The owner credentials may, for example, be a user identifier (ID) and password combination provided by the owner. The signing component 122 can respond to receipt of owner credentials from the owner, by generating and associating (block 504 of FIG. 5) a digital signature 130-A with the particular virtual machine 104-A, and controlling the virtual hypervisor 110 to continue with startup of the particular virtual machine 104-A.

The signature validation component 124 may generate a report to a system administrator that identifies which of the virtual machines 104 are not associated with the digital signatures identifying associated owners. For example, the signature validation component 124 may scan all virtual machines 104 that are controlled by the virtual hypervisor 110 to identify which of the virtual machines are not associated with an owner (i.e., aren't associated with one of the digital signatures). The scanning may be performed while the virtual machines 104 are not being actively executed under management of the virtual hypervisor 110, during start-up of the virtual machines 104, and/or during execution of the virtual machines 104. The report may, for example, be a single file having entries corresponding to different reported virtual machines or be plurality of files corresponding to different reported virtual machines.

The signing component 122 can add (block 600 of FIG. 6) contact information for an owner to the digital signature 130-A for a particular virtual machine 104-A. The contact information may include, but is not limited to, a user identifier, a password (which may be stored in an encrypted form), an email address, a telephone number, and/or a mailing address. The signature validation component 124 can access (block 602 of FIG. 6) the digital signature 130-A to identify the contact information for the owner in response to determining occurrence of a defined event associated with the particular virtual machine 104-A. The signature validation component 124 can then initiate (block 604 of FIG. 6) an electronic communication to the owner using the contact information.

For example, the signature validation component 124 can respond to occurrence of the defined event associated with the particular virtual machine 104-A by accessing the associated digital signature to identify an email address for the owner, and initiate an email communication to the owner using the email address.

An attempt to change the owner of a virtual machine may be the defined event that triggers initiation of an electronic communication to the owner of the virtual machine to confirm that the change is authorized. In one embodiment, the signature validation component 124 responds to receipt of a change ownership request, which requests a new owner for a particular virtual machine 104-A, by accessing (block 700 of FIG. 7) the associated digital signature to identify the contact information for the owner. The signature validation component 124 or the signing component 122 initiates (block 702 of FIG. 7) an electronic communication to the owner using the contact information to request authorization for the change of ownership to the new owner. The signature validation component 124 or the signing component 122 responds to receipt of an owner authorization for the change of ownership to the new owner, by updating (block 704 of FIG. 7) the digital signature for the particular virtual machine 104-A to identify the new owner.

Other defined events that may trigger initiation of an electronic communication to the owner of a virtual machine can include, but are not limited to, determining one or more of the following: 1) that the virtual machine is presently using a threshold amount of memory and/or processing resources; 2) that the virtual machine presently has less than a threshold amount of allocated memory remaining before attempting to exceed the allocated memory; 3) that the virtual machine is presently attempting to exceed an allocated memory space; and/or 4) that the virtual machine is attempting to access a communication resource (e.g., communicate through a defined network port, email or other defined communication process, and/or defined communication interface), a memory location, and/or size of allocated memory for which it is not presently authorized.

Responsive to occurrence of the defined event, which may be detected by the virtual hypervisor 110, the digital signature for the virtual machine 104 can be accessed (e.g., retrieved from an digital signature agent 130 and/or from the signature repository 120) to identify the contact information for the owner, and a message or other electronic communication can be sent to the owner requesting credentials or other authorization (which may be verified) before allowing the virtual machine 104 to proceed. The signature validation component 124 may cause the virtual hypervisor 110 to cease execution of the virtual machine 104 responsive to occurrence of the defined event and, when proper credentials or other authorization is received from the owner, can then cause the virtual hypervisor 110 to resume execution of the virtual machine. The virtual hypervisor 110 may take actions to address the triggering event before resuming execution of the virtual machine, such as by allocating more resources and/or authorizing access to further resources of the hardware platform 114.

In some embodiments, the digital signature may be used to control startup of a virtual machine 104 with or without any operation to communicate with an owner of the virtual machine 104, such as described above. The signature validation component 124 can determine (block 800 of FIG. 8) that the virtual hypervisor 110 is attempting to startup a particular one of the virtual machines 104-A. In response, the signature validation component 124 can obtain (block 802 of FIG. 8) the digital signature for the particular virtual machine 104-A, and may further determine (block 804 of FIG. 8) whether the digital signature is valid. In response to determining that the digital signature is valid, the signature validation component 124 can notify (block 804 of FIG. 8) the virtual hypervisor 110 to proceed with startup of the particular virtual machine 104-A. In contrast, in response to determining that the digital signature is not valid, the signature validation component 124 can notify (block 806 of FIG. 8) the virtual hypervisor 110 to cease startup of the particular virtual machine 104-A and initiate an electronic communication to the owner identified by the contact information.

In some embodiments, the digital signature may be used to control continued execution of a virtual machine 104 with or without any operation to communicate with an owner of the virtual machine 104, such as described above. The signature validation component 124 can repetitive attempt (block 900 of FIG. 9) to obtain digital signatures for virtual machines 104 operating under the management of the virtual hypervisor 110, and can control (block 902 of FIG. 9) the virtual hypervisor 110 to cease operation of any virtual machine 104 that is not associated with a digital signature. The repetitive attempts to obtain the digital signatures may be carried out periodically or responsive to another repetitively occurring event.

In some further embodiments, the continued execution of a virtual machine 104 can be controlled responsive to whether the associated digital signature is validated. For example, the signature validation component 124 can repetitive attempt (block 1000 of FIG. 10) to obtain digital signatures for virtual machines 104 operating under the management of the virtual hypervisor 110, and can determine (block 1002 of FIG. 10) whether the obtained digital signatures are valid. When a digital signature is not valid, the signature validation component 124 can control (block 1004 of FIG. 10) the virtual hypervisor 110 to cease operation of the virtual machine 104 that is associated with the invalid digital signature. Again, the repetitive attempts may be carried out periodically or responsive to another repetitively occurring event.

When a virtual machine 104 is associated with an invalid digital signature, the signature validation component 124 may trigger the signing component 122 to communicate with an owner of the virtual machine 104 to obtain credentials that can be validated and used to generate a digital signature for association with that virtual machine 104 (e.g., stored as a data component/agent 130 in the virtual machine 104). The signature validation component 124 may control the virtual hypervisor 110 to resume operation of the virtual machine 104 responsive to validation of the credentials.

Figure 2:
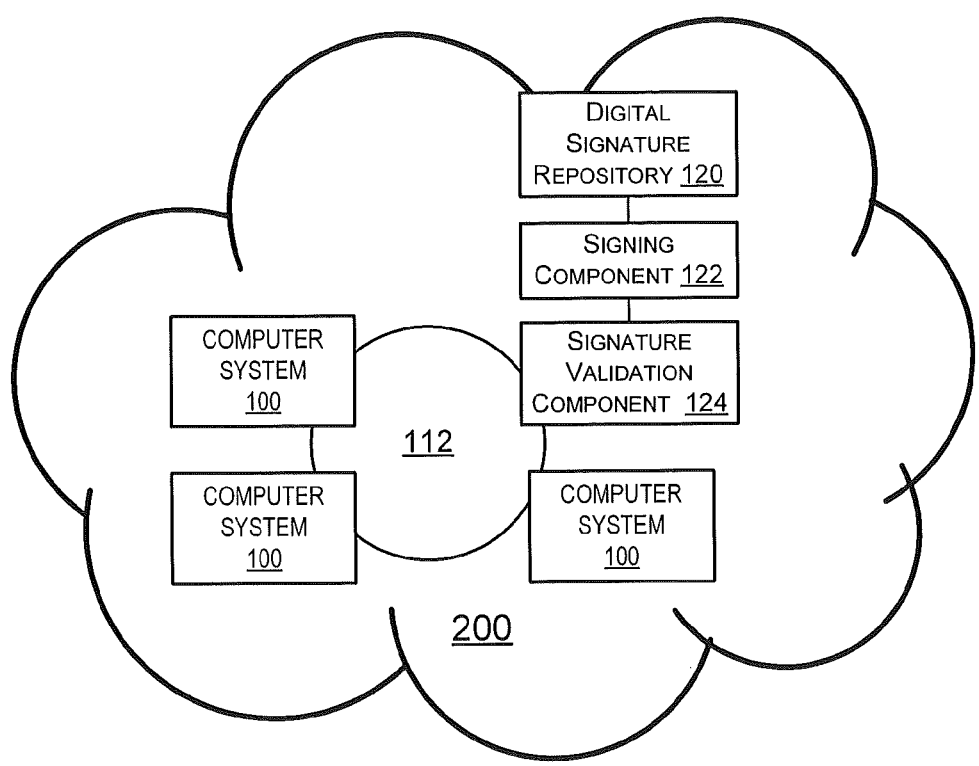
FIG. 2 illustrates a distributed computer environment that manages access to resources using digital signatures according to some embodiments.
Figure 3:
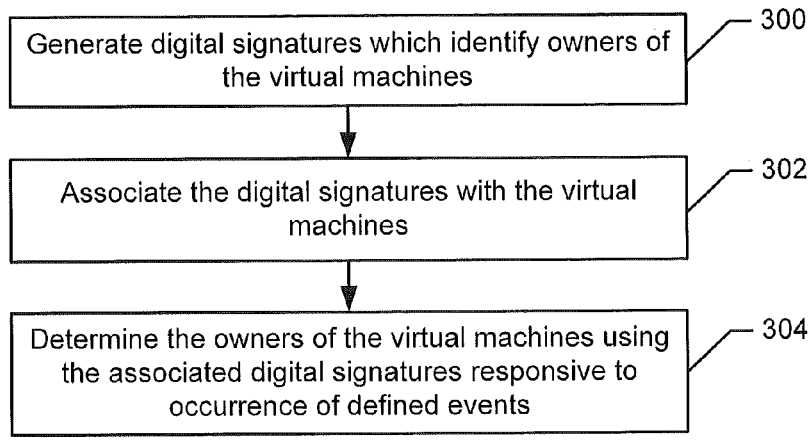
FIGS. 3-10 are flowcharts that illustrate methods and operations for generating digital signatures for owners of virtual machines, associating the digital signatures with the virtual machines, and managing the virtual machines responsive to the digital signatures according to some embodiments.
Figure 4:
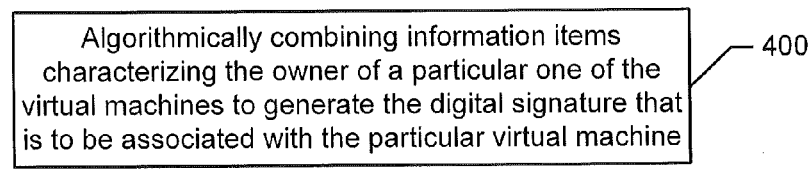
Figure 5:
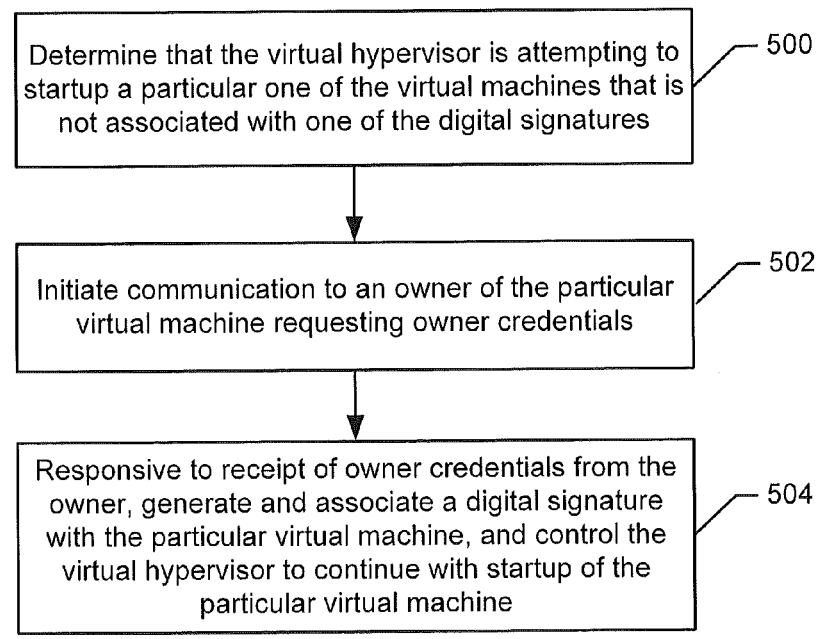
Figure 6:
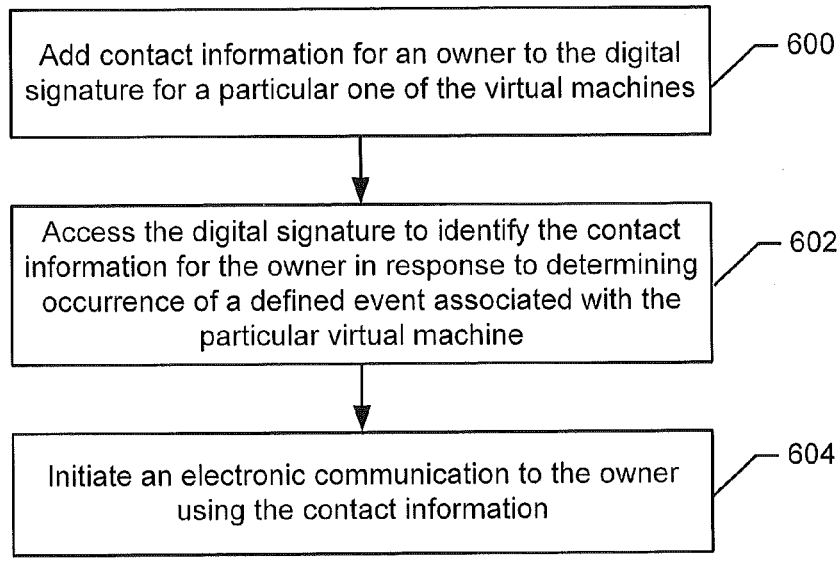
Figure 7:
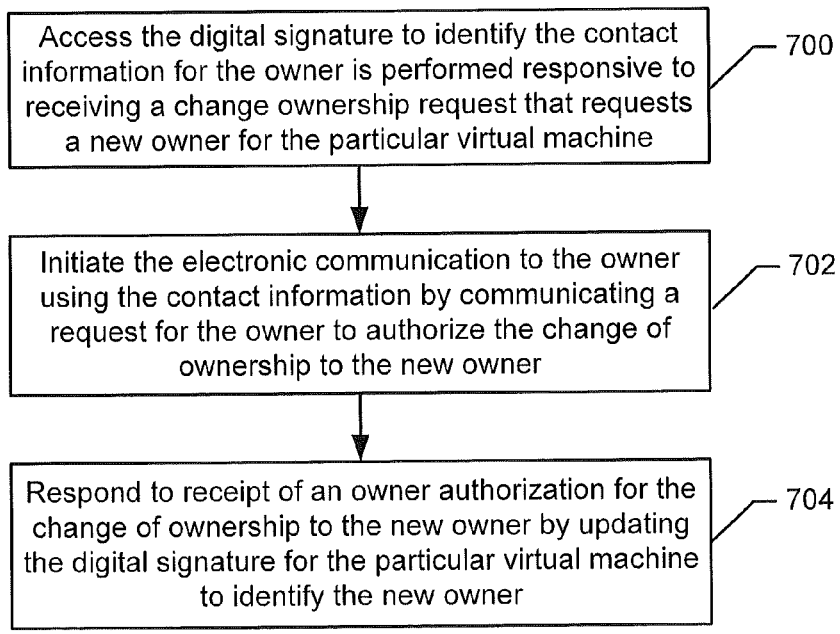
Figure 8:
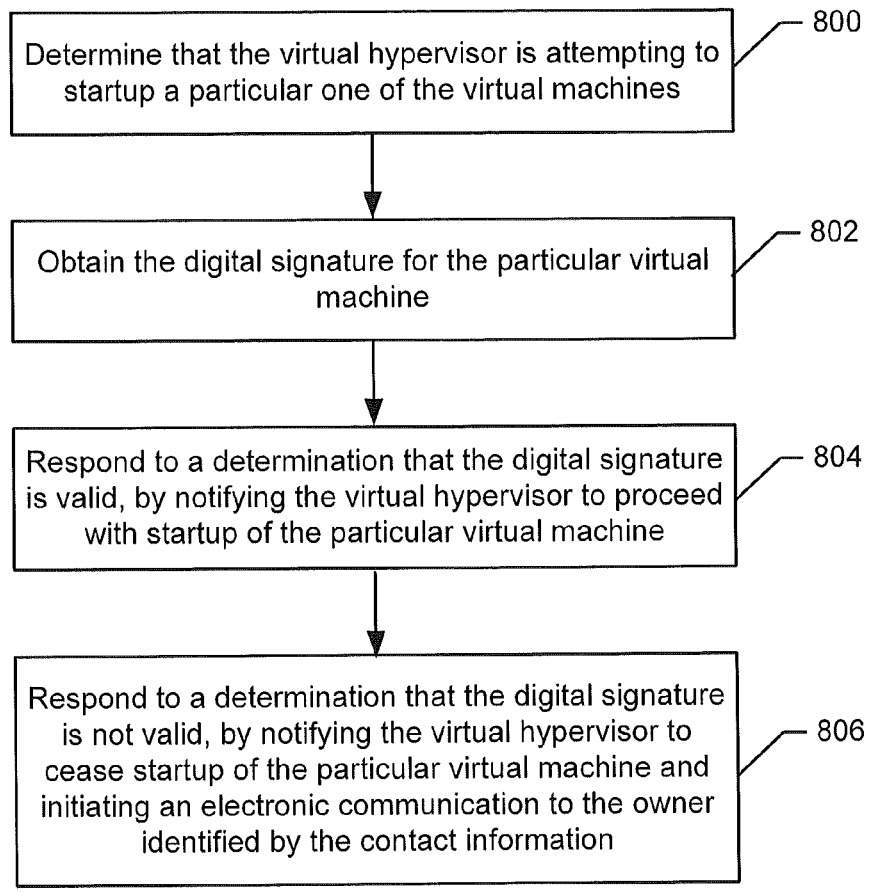
Figure 9:
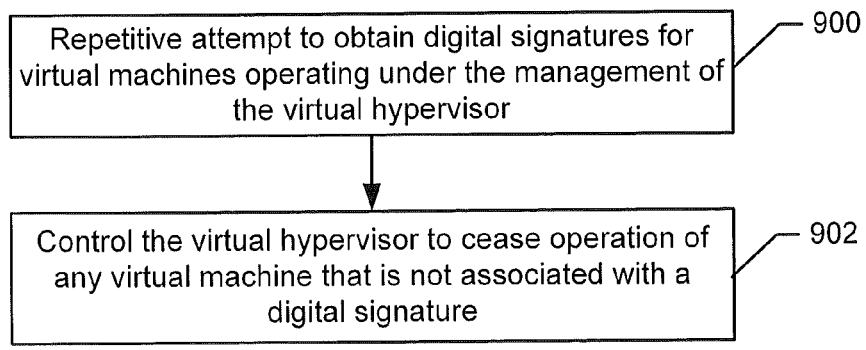
Figure 10:
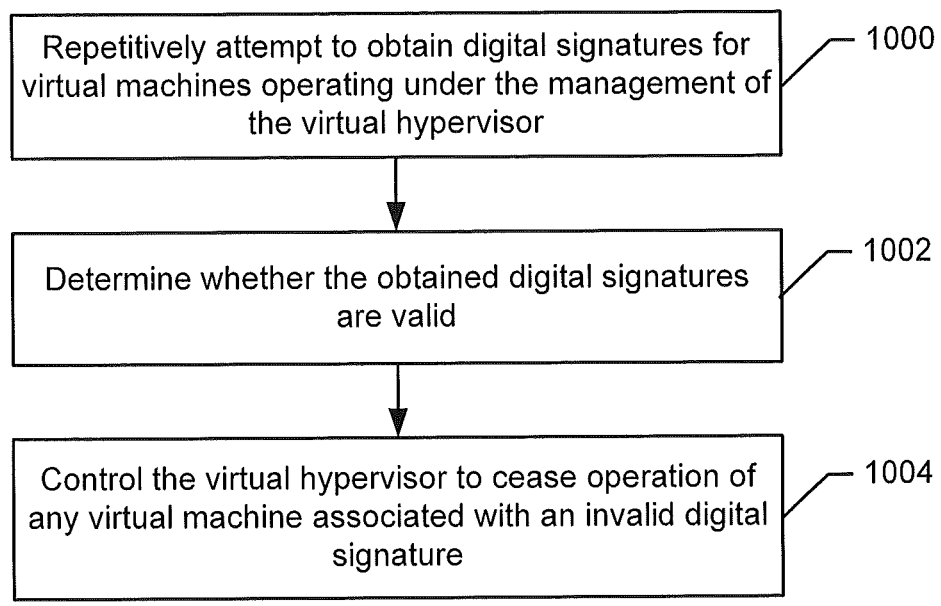

FIG. 2 illustrates a distributed computing environment in which the subject matter of the present disclosure can function. In FIG. 2, computer systems 100 are interconnected by one or more communication networks 112, and may collectively provide a cloud computing environment 200 to users. Each of the computer systems 100 may be configured as shown in FIG. 1 or may include one or more electronic computing devices operable to receive, transmit, process, and store data, and/or any suitable combination of software, firmware, and/or hardware. The network 112 facilitates wireless or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANS), wide area networks (WANs), all or a portion of the global computer network known as the Internet, and/or any other communication system or systems at one or more locations.

In contrast to the embodiment of FIG. 1, the policy repository 120, the signature repository 120, the signing component 122, and/or the signature validation component 124 of FIG. 2 may be separate from the computer systems 100 or may be partially within one or more of the computer systems 100. The computer systems 100 may be configured to operate according to one or more embodiments explained herein with regard to FIGS. 1 and 3-10.

As will be appreciated by one of skill in the art, embodiments disclosed herein may be implemented as methods, computer systems, and/or computer program products. Furthermore, the disclosed embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are disclosed herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

The invention claimed is:

1. A computer system, comprising:
a host operating system;
a virtual hypervisor to operate under management of the host operating system to control operations of virtual machines configured to operate under management of the virtual hypervisor, wherein the virtual hypervisor provides an interface between the virtual machines and the host operating system;
a signing component to generate digital signatures which identify owners of the virtual machines and associates the digital signatures with the virtual machines, wherein the signing component adds electronic communication contact information for an owner to the digital signature for a particular virtual machine among the virtual machines;
a signature validation component that determines the owners of the virtual machines using the digital signatures and responsive to occurrence of defined events, the signature validation component responds to the virtual hypervisor attempting to startup the particular virtual machine by:
obtaining the digital signature for the particular virtual machine,
determining whether the digital signature is valid, and
responsive to determining that the digital signature is valid, authorizing the virtual hypervisor to proceed with startup of the particular virtual machine,
responsive to determining that the digital signature associated with the particular virtual machine is not valid, identifying the electronic communication contact information for the owner using the digital signature, and initiating an electronic communication to the owner using the electronic communication contact information;
wherein the signing component adds an email address for the owner to the digital signature for the particular virtual machine; and
the signature validation component further responds to determining that the digital signature associated with the particular virtual machine is not valid by accessing the associated digital signature to identify the email address for the owner, and initiating an email communication to the owner using the email address.

2. The computer system of claim 1, wherein:
the signing component combines information items identifying the owner of the particular virtual machine to generate one of the digital signatures that becomes associated with the particular virtual machine.

3. The computer system of claim 1, wherein:
the email communication comprises the email address for the owner and a return email address for the computer system; and
the signature validation component further responds to determining that the digital signature associated with the particular virtual machine is not valid by:
controlling the virtual hypervisor to cease startup of the particular virtual machine;
receiving an electronic response from the owner responsive to the email communication, the electronic response comprising owner credentials and the return email address for the computer system;
responsive to determining that the owner credentials are valid, controlling the virtual hypervisor to continue with startup of the particular virtual machine.

4. The computer system of claim 1, wherein:
the signature validation component generates a report that identifies which of the virtual machines are not associated with the digital signatures identifying associated owners.

5. The computer system of claim 1, wherein:
the signing component responds to a change ownership request that requests a new owner for the particular virtual machine by accessing the associated digital signature to identify the email address for the owner and initiating another electronic communication to the owner using the email address, the another electronic communication requesting owner authorization for the change, and responds to receipt of owner authorization for the change by updating the digital signature for the particular virtual machine to identify an email address for the new owner.

6. The computer system of claim 1, wherein:
the signing component adds a digital signature as an agent component of the particular virtual machine; and
the signature validation component queries the agent component of the particular virtual machine to obtain the digital signature, and determines the electronic communication contact information for the owner of the particular virtual machine responsive to the digital signature obtained from agent component.

7. The computer system of claim 1, wherein:
the signature validation component repetitively attempts to obtain digital signatures for virtual machines operating under management of the virtual hypervisor, and controls the virtual hypervisor to cease operation of any virtual machine that is not associated with a digital signature.

8. The computer system of claim 1, wherein:
the signature validation component repetitively obtains digital signatures for virtual machines operating under management of the virtual hypervisor, validates the obtained digital signatures, and controls the virtual hypervisor to cease operation of any virtual machine associated with an invalid digital signature.

9. A method of operating a computer system including a plurality of virtual machines that are managed by a virtual hypervisor, the method comprising:
generating digital signatures which identify owners of the virtual machines and associating the digital signatures with the virtual machines, wherein the digital signatures comprises electronic communication contact information for owners of the associated virtual machines;
responsive to determining that the virtual hypervisor is attempting to startup one of the virtual machines, performing:
obtaining the digital signature associated with the one of the virtual machines;
determining whether the digital signature is valid;
responsive to determining that the digital signature is valid, notifying the virtual hypervisor to proceed with startup of the one of the virtual machines;
responsive to determining that the digital signature is not valid, identifying the electronic communication contact information for the owner using the digital signature, and initiating an electronic communication to the owner using the electronic communication contact information;
wherein generating digital signatures which identify owners of the virtual machines and associating the digital signatures with the virtual machines, comprises adding email addresses as the electronic communication contact information for owners of the associated virtual machines; and responsive to determining that the digital signature is not valid, identifying the email address for the owner using the digital signature, and initiating an email communication to the owner using the email address.

10. The method of claim 9, wherein:

the email communication comprises the email address for the owner and a return email address for the computer system; and responsive to determining that the digital signature is not valid,
- controlling the virtual hypervisor to cease startup of the one of the virtual machines,
- receiving an electronic response from the owner responsive to the email communication, the electronic response comprising owner credentials and the return email address for the computer system, and
- responsive to determining that the owner credentials are valid, controlling the virtual hypervisor to continue with startup of the one of the virtual machines.

11. The method of claim 9, further comprising:

receiving a change ownership request that requests a new owner for the one of the virtual machines;

obtaining the digital signature associated with the one of the virtual machines to identify the email address for the owner;

initiating another electronic communication to the owner using the email address for the owner, the another electronic communication requesting owner authorization for the change of ownership to the new owner; and responding to receipt of an owner authorization for the change of ownership to the new owner by updating the digital signature for the one of the virtual machines to identify an email address for the new owner.

12. The method of claim 9, further comprising:

repetitively attempting to obtain digital signatures for virtual machines operating under management of the virtual hypervisor; and controlling the virtual hypervisor to cease operation of any virtual machine that is not associated with a digital signature.

13. The method of claim 9, further comprising:

repetitively attempting to obtain digital signatures for virtual machines operating under management of the virtual hypervisor;

determining whether the obtained digital signatures are valid; and controlling the virtual hypervisor to cease operation of any virtual machine associated with an invalid digital signature.

14. A computer program product for operating a computer system including a plurality of virtual machines that are managed by a virtual hypervisor, the computer program product comprising:

a non-transitory computer readable storage medium having computer readable program code embodied in the medium that when executed by a processor of the computer system causes the computer system to perform operations comprising:

generating digital signatures which identify owners of the virtual machines and associating the digital signatures with the virtual machines, wherein the digital signatures comprises electronic communication contact information for owners of the associated virtual machines;

responsive to determining that the virtual hypervisor is attempting to startup one of the virtual machines, performing:
- obtaining the digital signature associated with the one of the virtual machines;
- determining whether the digital signature is valid;
- responsive to determining that the digital signature is valid, notifying the virtual hypervisor to proceed with startup of the one of the virtual machines;
- responsive to determining that the digital signature is not valid, identifying the electronic communication contact information for the owner using the digital signature, and initiating an electronic communication to the owner using the electronic communication contact information;

wherein generating digital signatures which identify owners of the virtual machines and associating the digital signatures with the virtual machines, comprises adding email addresses as the electronic communication contact information for owners of the associated virtual machines; and responsive to determining that the digital signature is not valid, identifying the email address for the owner using the digital signature, and initiating an email communication to the owner using the email address.

15. The computer program product of claim 14, wherein:

the email communication comprises the email address for the owner and a return email address for the computer system; and responsive to determining that the digital signature is not valid,
- controlling the virtual hypervisor to cease startup of the one of the virtual machines,
- receiving an electronic response from the owner responsive to the email communication, the electronic response comprising owner credentials and the return email address for the computer system, and
- responsive to determining that the owner credentials are valid, controlling the virtual hypervisor to continue with startup of the one of the virtual machines.

* * * * *